United States Patent
Du et al.

(10) Patent No.: US 12,424,019 B2
(45) Date of Patent: Sep. 23, 2025

(54) ULTRASONIC FINGERPRINT APPARATUS AND ELECTRONIC DEVICE

(71) Applicant: HUIKE (SINGAPORE) HOLDING PTE.LTD., Singapore (SG)

(72) Inventors: Canhong Du, Shenzhen (CN); Dengxin Ji, Shenzhen (CN); Yuwang Xu, Shenzhen (CN); Chengzuo Wang, Shenzhen (CN); Hongchao Wang, Shenzhen (CN)

(73) Assignee: HUKE (SINGAPORE) HOLDING PTE. LTD., Singapore (SG)

( * ) Notice: Subject to any disclaimer, the term of this patent is extended or adjusted under 35 U.S.C. 154(b) by 0 days.

(21) Appl. No.: 18/900,745

(22) Filed: Sep. 29, 2024

(65) Prior Publication Data

US 2025/0022307 A1 Jan. 16, 2025

Related U.S. Application Data

(63) Continuation of application No. PCT/CN2022/118468, filed on Sep. 13, 2022.

(51) Int. Cl.
*G06V 40/13* (2022.01)
*G06V 10/147* (2022.01)

(52) U.S. Cl.
CPC ........ *G06V 40/1306* (2022.01); *G06V 10/147* (2022.01); *G06V 40/1329* (2022.01)

(58) Field of Classification Search
CPC ............. G06V 40/1306; G06V 10/147; G06V 40/1329; G06V 40/13; G06F 18/00
See application file for complete search history.

(56) References Cited

U.S. PATENT DOCUMENTS 11,908,224 B2  2/2024  Liu et al.
2014/0369573 A1  12/2014  Chiu
(Continued)

FOREIGN PATENT DOCUMENTS

CN  106711320 A  5/2017
CN  109614963 A  4/2019
(Continued)

OTHER PUBLICATIONS

PCT International Search report of PCT/CN2022/118468 issued on Jan. 18, 2023.
(Continued)

*Primary Examiner* — Abhishek Sarma
(74) *Attorney, Agent, or Firm* — Emerson, Thomson & Bennett, LLC; Roger D. Emerson; Todd A. Fichtenberg

(57) ABSTRACT

The present disclosure provides an ultrasonic fingerprint apparatus and an electronic device. The ultrasonic fingerprint apparatus includes an ultrasonic fingerprint chip and a piezoelectric transducer arranged above the ultrasonic fingerprint chip; the piezoelectric transducer includes a piezoelectric layer, an upper electrode located above the piezoelectric layer, and a lower electrode located below the piezoelectric layer; the ultrasonic fingerprint chip includes a substrate and a plurality of metal layers arranged in a first region of the substrate, the lower electrode is located above a second region of the substrate, a top metal layer among the plurality of metal layers includes N drive traces, a passivation layer is provided above the top metal layer, and provided with a first window corresponding to the N drive traces, and the upper electrode extends from an upper surface of the piezoelectric layer into the first window.

18 Claims, 10 Drawing Sheets

(56) References Cited

U.S. PATENT DOCUMENTS

| | | |
|---|---|---|
| 2020/0234021 A1 | 7/2020 | Lu et al. |
| 2021/0216735 A1 | 7/2021 | Guo et al. |
| 2022/0036027 A1 | 2/2022 | Li et al. |
| 2022/0075978 A1 | 3/2022 | Liu |
| 2023/0005290 A1* | 1/2023 | Liu ...................... B06B 1/0207 |

FOREIGN PATENT DOCUMENTS

| | | |
|---|---|---|
| CN | 111428702 A | 7/2020 |
| CN | 111738227 A | 10/2020 |
| CN | 112183168 A | 1/2021 |
| CN | 112183169 A | 1/2021 |
| CN | 113822101 A | 12/2021 |
| CN | 114758367 A | 7/2022 |

OTHER PUBLICATIONS

Extended search report of EP22958351.3 issued by EPO on Jun. 27, 2025.

* cited by examiner

ULTRASONIC FINGERPRINT APPARATUS AND ELECTRONIC DEVICE

CROSS-REFERENCE TO RELATED APPLICATIONS AND INCORPORATION BY REFERENCE

The present application is a continuation of international application No. PCT/CN2022/118468, filed on Sep. 13, 2022, which is hereby incorporated by reference in its entirety.

TECHNICAL FIELD

Embodiments of the present disclosure relate to the field of fingerprint identification, and more specifically relate to an ultrasonic fingerprint apparatus and an electronic device.

BACKGROUND

With the social progress, a mobile phone has become one of essential electronic devices in modern life. At present, all mobile phones on the market have one or more identity authentication methods, including a digital password, a gesture pattern, face identification, fingerprint identification, and the like. Characterized by convenient application, fast identification speed, stability, reliability, and the like, fingerprint identification has become a standard configuration for most mobile phones. Different technical routes have developed for fingerprint identification, including capacitive fingerprint identification, optical fingerprint identification, ultrasonic fingerprint identification, and the like.

Due to strong penetrability of ultrasound, ultrasonic fingerprint identification not only can identify surface appearance of a fingerprint, but also can identify a signal from a dermal layer of a finger. Therefore, ultrasonic fingerprint identification has gradually become a new method for fingerprint identification. The ultrasonic fingerprint apparatus generally includes a piezoelectric transducer and an ultrasonic fingerprint chip. How to achieve integration between the piezoelectric transducer and the ultrasonic fingerprint chip has become a to-be-solved problem.

SUMMARY

Embodiments of the present disclosure provide an ultrasonic fingerprint apparatus and an electronic device, which can achieve integration between a piezoelectric transducer and an ultrasonic fingerprint chip.

In a first aspect, an ultrasonic fingerprint apparatus is provided, wherein the ultrasonic fingerprint apparatus is arranged under a display screen of an electronic device to implement under-display ultrasonic fingerprint identification, and includes an ultrasonic fingerprint chip and a piezoelectric transducer arranged above the ultrasonic fingerprint chip; the piezoelectric transducer includes a piezoelectric layer, an upper electrode located above the piezoelectric layer, and a lower electrode located below the piezoelectric layer; and the ultrasonic fingerprint chip includes a substrate and a plurality of metal layers arranged in a first region of the substrate, the lower electrode is located above a second region of the substrate, a top metal layer among the plurality of metal layers includes N drive traces, N=1 or N is a positive integer greater than 1, a passivation layer is provided above the top metal layer, and provided with a first window corresponding to the N drive traces, and the upper electrode extends from an upper surface of the piezoelectric layer into the first window for connection to respective first connection regions of the N drive traces located in the first window.

In an embodiment of the present disclosure, the top metal layer of the ultrasonic fingerprint chip includes drive traces for connection to the upper electrode, and the passivation layer above the top metal layer is provided with the first window corresponding to the drive traces. The upper electrode extends from the upper surface and an edge of the piezoelectric layer into the first window, and covers the first connection regions of the drive traces located in the first window, thereby achieving an electrical connection between the upper electrode and the drive traces, and achieving integration between the piezoelectric transducer and the ultrasonic fingerprint chip. Through the drive traces, a driving signal can be transmitted from a circuit board below the ultrasonic fingerprint chip to the piezoelectric transducer to excite the piezoelectric transducer to generate an ultrasonic signal for fingerprint identification. In addition, a signal of the upper electrode may be further led out to the circuit board through the drive traces.

In an implementation, the first window includes N sub-windows corresponding to the N drive traces, and a respective first connection regions of each of the drive traces is located in a sub-window corresponding to the drive trace.

In an implementation, the substrate is a silicon substrate, and the passivation layer is further provided with N second windows corresponding to the N drive traces, wherein a second connection region of each of the drive traces located in its corresponding second window is connected to the circuit board below the ultrasonic fingerprint chip through a corresponding lead wire. Due to the use of an ultrasonic fingerprint chip with a silicon substrate, a bonding process can be implemented on the ultrasonic fingerprint chip to connect the drive traces to the circuit board through the lead wire.

In an implementation, the piezoelectric layer extends onto the plurality of metal layers, the N drive traces extend into the piezoelectric layer, and the first connection regions of the N drive traces are adjacent to the piezoelectric layer.

When the piezoelectric layer extends onto the plurality of metal layers and the drive traces extend into the piezoelectric layer, the first connection regions of the drive traces can be made to be close to the edge of the piezoelectric layer, that is, a distance between the piezoelectric layer and each of the first connection regions is minimized, making the structure of the ultrasonic fingerprint apparatus more compact.

In an implementation, a size of the first window is larger than a size of the first connection regions of the N drive traces, the upper electrode extends from the upper surface of the piezoelectric layer into a first part of the first window to cover the first connection regions of the N drive traces, and a second part of the first window is located under the piezoelectric layer.

When the size of the first window is larger than the size of the first connection regions, the upper electrode extends into the first part of the first window to cover one of the first connection regions in the first part where the drive traces are located, and the second part of the first window extends into the piezoelectric layer and is located below the piezoelectric layer, thereby improving the connection reliability between the upper electrode and the drive traces.

In an implementation, a size of the first part in a direction of the N drive traces is larger than or equal to 150 µm; and/or a size of the second part in the direction of the N drive traces is larger than or equal to 20 µm.

In an implementation, a distance between other traces adjacent to the N drive traces in the top metal layer and the N drive traces is larger than or equal to 10 μm.

The driving signal of the upper electrode is generally at a high voltage, is significantly higher than a working voltage of a circuit in the ultrasonic fingerprint chip, and not only tends to interfere with the circuit in the ultrasonic fingerprint chip, but also tends to cause electrical breakdown damage to the ultrasonic fingerprint chip. Therefore, a distance should be maintained between other traces adjacent to the drive traces on the top metal layer and the drive traces, to avoid the occurrence of intralayer breakdown, ensure the safety of the ultrasonic fingerprint apparatus, and prevent the drive traces from interfering with the other traces on the top metal layer.

In an implementation, the other traces adjacent to the N drive traces in the top metal layer are grounded, so that the top metal layer has shielding effects on the N drive traces, thereby preventing the N drive traces from interfering with the other traces on the top metal layer.

In an implementation, a region corresponding to the N drive traces in a first metal layer among the plurality of metal layers is punched, and the first metal layer is an adjacent metal layer located below the top metal layer.

Since the first metal layer is the adjacent metal layer located below the top metal layer, the corresponding region of the first metal layer located below the N drive traces is punched, to increase an electrical gap between the N drive traces and other traces of the first metal layer, thereby increasing the withstand voltage strength of the first metal layer, and avoiding the occurrence of interlayer breakdown between the top metal layer and the first metal layer.

In an implementation, the region corresponding to the N drive traces in the first metal layer and a surrounding region extending 12 μm or more in all directions from the region are punched.

The punched region is extended a certain distance in all directions from the region corresponding to the N drive traces, thereby still further increasing the electrical gap between the drive traces and the other traces of the first metal layer, and minimizing the occurrence of interlayer breakdown between the top metal layer and the first metal layer.

In an implementation, a region corresponding to the N drive traces in a second metal layer among the plurality of metal layers is grounded, and the second metal layer is an adjacent metal layer located below the first metal layer.

Since the second metal layer is an adjacent metal layer located below the first metal layer, the corresponding region of the second metal layer located below the drive traces is grounded, so that the second metal layer has shielding effects on the N drive traces, thereby preventing other traces on the second metal layer from interfering with traces on a third metal layer located below the second metal layer.

In an implementation, the region corresponding to the N drive traces on the second metal layer and a surrounding region extending 12 μm or more in all directions from the region are grounded.

The grounded region in the second metal layer is extended a certain distance in all directions from the region corresponding to the N drive traces, thereby still further enhancing the shielding effects of the second metal layer on the drive traces, and minimizing the interference of the other traces on the second metal layer with the traces on the third metal layer located below the second metal layer.

In an implementation, the top metal layer is provided with a bonding pad for grounding, and the bonding pad is arranged beside the second connection regions of the N drive traces.

In order to prevent a high voltage of the drive traces from causing electrical breakdown and interference to the metal layer in the ultrasonic fingerprint chip, a grounded bonding pad is arranged beside the second connection region of the drive traces, with a certain distance between the bonding pad and the second connection region, thereby preventing the driving signal from interfering with other surrounding signals.

In an implementation, a distance between the lower electrode and the passivation layer around the lower electrode is larger than or equal to 100 μm; and/or the other traces adjacent to the lower electrode in the top metal layer are grounded.

There is a certain spacing between the lower electrode and the passivation layer around the lower electrode, and/or other traces adjacent to the lower electrode on the top metal layer are grounded, which can play a shielding role to prevent external interference from affecting pixels in the proximity of an edge in an array of the lower electrode, while reducing the edge effects of edge pixels and improving the consistency between the edge effects and center pixels.

In an implementation, a distance between an edge of the upper electrode and an edge of the piezoelectric layer is larger than or equal to 50 μm, thereby preventing the upper electrode from overflowing to a surface of the ultrasonic fingerprint chip, and avoiding the risks of breakdown.

In an implementation, N=1, and an area of a part of the first window close to the piezoelectric layer is larger than an area of a part of the first window away from the piezoelectric layer, thereby improving the connection reliability between the upper electrode and the drive traces.

In an implementation, a shape of the first window is a trapezoid, where a lower base of the trapezoid is closer to the piezoelectric layer than an upper base thereof.

In an implementation, a shape of the first window is an L-shape, the L-shape comprises a first part parallel to a direction of the drive traces and a second part perpendicular to the direction of the drive traces, and the second part is closer to the piezoelectric layer than the first part.

In a second aspect, an electronic device is provided, including: a screen; and the ultrasonic fingerprint apparatus according to the first aspect or any one implementation in the first aspect, wherein the ultrasonic fingerprint apparatus is arranged under the screen to implement under-display ultrasonic fingerprint identification.

DETAILED DESCRIPTION

Figure 1:
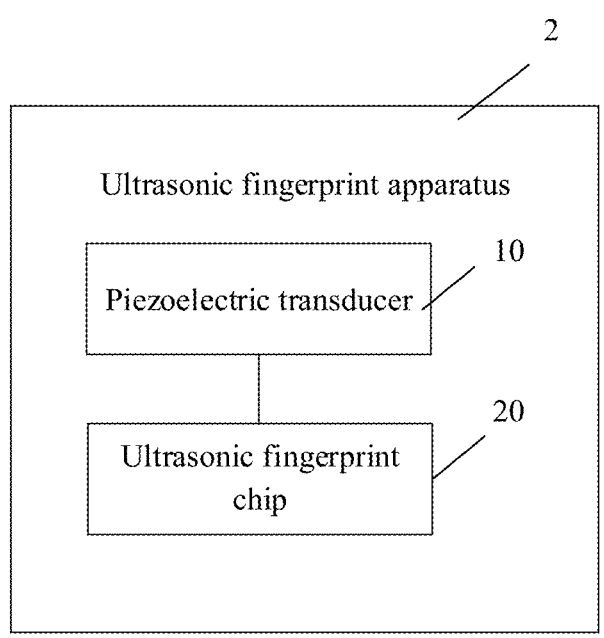
FIG. 1 is a schematic block diagram of an ultrasonic fingerprint apparatus in an embodiment of the present disclosure.

Technical solutions of the present disclosure will be described below with reference to the drawings.

An ultrasonic fingerprint apparatus includes an ultrasonic fingerprint chip and a piezoelectric transducer. The piezoelectric transducer includes a piezoelectric layer formed of a piezoelectric material layer, and electrodes located on both sides of the piezoelectric layer. The piezoelectric transducer is also referred to as an ultrasonic transducer, and is integrated on the ultrasonic fingerprint chip. The ultrasonic fingerprint chip is an Application Specific Integrated Circuit (ASIC) for ultrasonic fingerprint identification, such as a CMOS chip. The ultrasonic fingerprint chip can output a driving signal and load it to the electrodes of the piezoelectric layer. Under the action of the driving signal, based on the piezoelectric effects, the piezoelectric layer vibrates, thereby emitting an ultrasonic signal to a finger above a display screen. The ultrasonic signal is transmitted to a surface of the finger, and reflected or scattered at a fingerprint valley and a fingerprint ridge to return an ultrasonic detection signal. The ultrasonic detection signal is transmitted to the piezoelectric layer. Based on the inverse piezoelectric effects, a potential difference is generated between the electrodes on both sides of the piezoelectric layer, to obtain a corresponding electrical signal. After subsequent processing of the electrical signal, fingerprint information of the finger can be obtained.

The ultrasonic fingerprint apparatus generally includes a piezoelectric transducer and an ultrasonic fingerprint chip. The piezoelectric transducer is arranged above the ultrasonic fingerprint chip. The piezoelectric transducer includes a piezoelectric layer, an upper electrode located above the piezoelectric layer, and a lower electrode located below the piezoelectric layer. First, the upper electrode needs to be led out, such as led out to a surface of the ultrasonic fingerprint chip, so as to achieve an electrical connection between the upper electrode and a circuit board below the ultrasonic fingerprint chip, so that a driving signal outputted from the circuit board can be applied to the ultrasonic transducer; and then, a driving signal of the upper electrode generally needs a high voltage of tens of volts. If the driving signal of the upper electrode is led out to the surface of the ultrasonic fingerprint chip, since a drive voltage of the upper electrode is significantly higher than a working voltage of a circuit in the ultrasonic fingerprint chip, the driving signal of the upper electrode tends to interfere with the circuit in the ultrasonic fingerprint chip, and further tends to cause electrical breakdown damage to the ultrasonic fingerprint chip.

To this end, the present disclosure presents a technical solution that can achieve integration between the piezoelectric transducer and the ultrasonic fingerprint chip, and can ensure the safety of the ultrasonic fingerprint chip.

Also referring to FIG. 1, FIG. 1 shows a schematic block diagram of an ultrasonic fingerprint apparatus 2 in an embodiment of the present disclosure. The ultrasonic fingerprint apparatus 2 includes an ultrasonic fingerprint chip 20 and a piezoelectric transducer 10 arranged above the ultrasonic fingerprint chip 20. The piezoelectric transducer 10 includes a piezoelectric layer 110, an upper electrode 120 located above the piezoelectric layer 110, and a lower electrode 130 located below the piezoelectric layer 110.

The ultrasonic fingerprint chip 20 includes a substrate 210 and a plurality of metal layers arranged in a first region 201 of the substrate 210. The lower electrode 130 is located above a second region 202 of the substrate 210.

A top metal layer TM among the plurality of metal layers includes N drive traces 230, where N=1 or N is a positive integer greater than 1. A passivation layer 220 is provided above the top metal layer TM, and is provided with a first window 221 corresponding to the N drive traces 230. A part of each of the drive traces 230 located in the first window 221 is a first connection region 231 of the drive traces 230. The upper electrode 120 extends from an upper surface of the piezoelectric layer 110 into the first window 221 for connection to respective first connection regions 231 of the N drive traces 230 located in the first window 221.

In an embodiment of the present disclosure, the top metal layer TM of the ultrasonic fingerprint chip 20 includes N drive traces 230 for connection to the upper electrode 120, and the passivation layer 220 above the top metal layer TM is provided with the first window 221 corresponding to the drive traces 230. The upper electrode 120 extends from the upper surface and an edge of the piezoelectric layer 110 into the first window 221, and covers the first connection regions 231 of the drive traces 230 located in the first window 221, thereby achieving an electrical connection between the upper electrode 120 and the drive traces 230, and achieving integration between the piezoelectric transducer 10 and the ultrasonic fingerprint chip 20. Through the drive traces 230, a driving signal can be transmitted from a circuit board 30 below the ultrasonic fingerprint chip 20 to the piezoelectric transducer 10 to excite the piezoelectric transducer 10 to generate an ultrasonic signal for fingerprint identification. In addition, a signal of the upper electrode 120 may be further led out to the circuit board 30 through the drive traces 230.

As an example, the ultrasonic fingerprint apparatus 2 in embodiments of the present disclosure will be described in detail below with reference to FIGS. 2-9. The ultrasonic fingerprint apparatus 2 in the embodiments of the present disclosure may be arranged under a display screen of an electronic device to implement under-display ultrasonic fingerprint identification.

Figure 2:
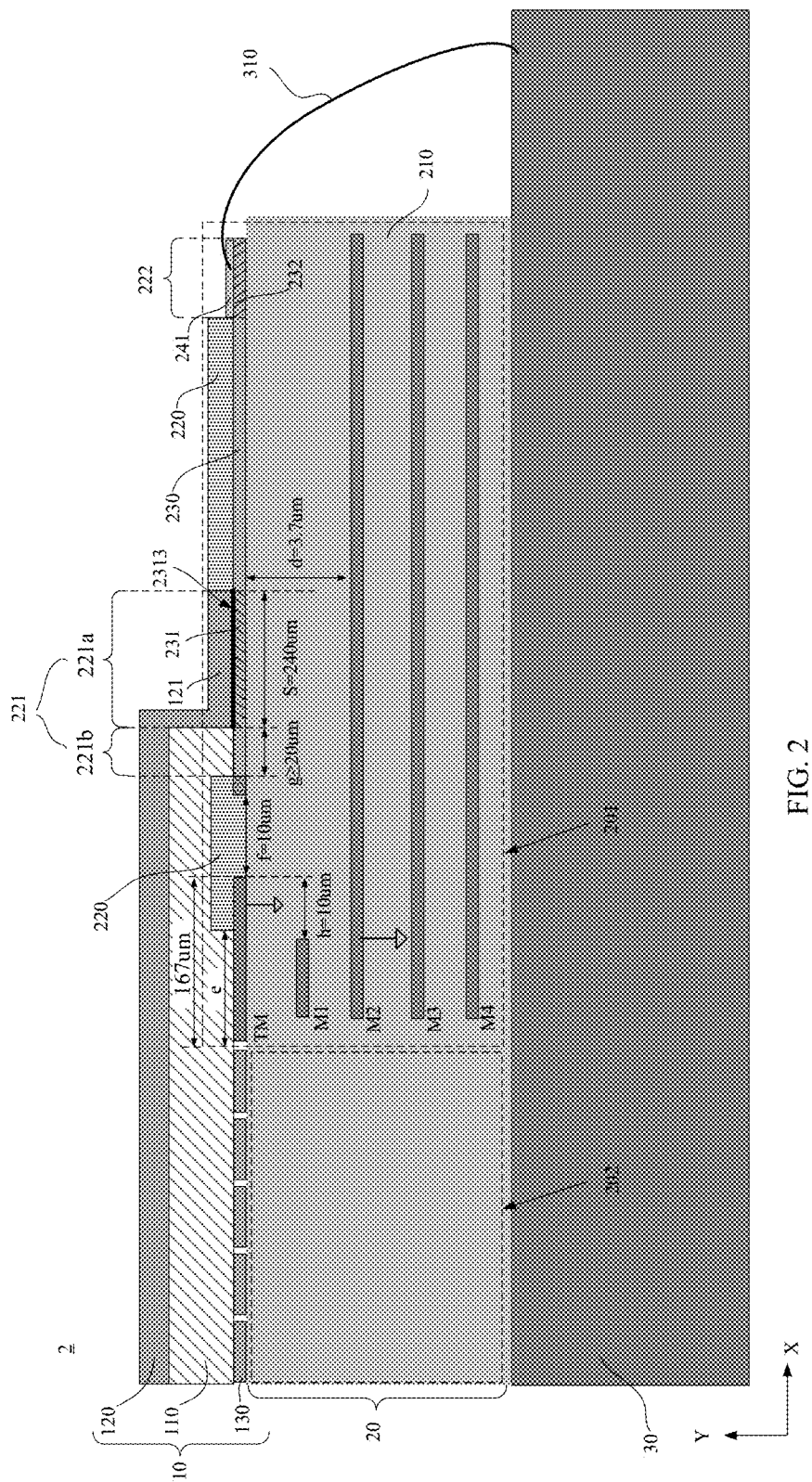
FIG. 2 is a possible specific implementation of the ultrasonic fingerprint apparatus shown in FIG. 1.

As shown in FIG. 2, the ultrasonic fingerprint apparatus 2 includes a piezoelectric transducer 10 and an ultrasonic fingerprint chip 20. The piezoelectric transducer 10 is arranged above the ultrasonic fingerprint chip 20. The piezoelectric transducer 10 includes a piezoelectric layer 110, an upper electrode 120 located above the piezoelectric layer 110, and a lower electrode 130 located below the piezoelectric layer 110. The ultrasonic fingerprint chip 20 includes a substrate 210 and a plurality of metal layers arranged in a first region 201 of the substrate 210. In FIG. 2, the plurality of metal layers include, for example, a first metal layer M1, a second metal layer M2, a third metal layer M3, a fourth metal layer M4, and a top metal layer TM. The ultrasonic fingerprint chip 20 further includes a protective layer 220 located above the plurality of metal layers, such as a passivation layer 220. The passivation layer 220 is used for protection. The lower electrode 130 is located above a second region 202 of the substrate 210.

The ultrasonic fingerprint chip 20 may be a CMOS chip, and its substrate 210 is, for example, a silicon substrate.

The top metal layer TM includes drive traces 230, that is, the drive traces 230 are manufactured on the top metal layer TM. In addition, the top metal layer TM may further include other traces. One terminal of the drive traces 230 is close to the piezoelectric layer 110, and the other terminal is close to a die edge of the ultrasonic fingerprint chip 20. A first window 221 is provided above the passivation layer 220, and the upper electrode 120 covers an upper surface of the piezoelectric layer 110 and is filled in the first window 221, so that the upper electrode 120 contacts with first connection regions 231 of the drive traces 230 located in the first window 221.

The upper electrode 120 is generally made of a silver paste (Ag) material. The upper electrode 120 is formed as a silver paste pad 121 on the first connection regions 231 of the drive traces 230 to achieve direct interconnection between the top metal layer TM and the upper electrode 120. Specifically, the uncured silver paste has fluidity and can extend from the upper surface of the piezoelectric layer 110 along its edge into the first window 221, to be simultaneously formed on the upper surface of the piezoelectric layer 110 and in the first window 221, so that the upper electrode 120 contacts with a part of the drive traces 230 located in the first window 221. The silver paste can cross a three-dimensional structure of the piezoelectric layer 110, and can form the silver paste pad 121 on the first connection regions 231 of the drive traces 230 through the first window 221.

It should be understood that the upper electrode 120 extends from the upper surface of the piezoelectric layer 110 into the first window 221, which means that the upper electrode 120 extends from the upper surface of the piezoelectric layer 110 into the first window 221, and covers a part of or all space in the first window 221. Generally, in order to prevent the silver paste of the upper electrode 120 from overflowing from the first window 221, the silver paste only needs to cover a part of the space in the first window 221, as long as the silver paste can contact with the drive traces 230 without the need of filling the entire first window 221.

In an implementation, the first window 221 includes N sub-windows corresponding to the N drive traces 230, and the first connection region 231 of each of the drive traces 230 is located in a corresponding sub-window corresponding to the drive trace.

That is to say, the first window 221 may be a complete window, and the first connection regions 231 of the N drive traces 230 are all located in the first window 221. The upper electrode 120 extends from the upper surface of the piezoelectric layer 110 into the first window 221, and is connected to the first connection regions 231 of the N drive traces in the first window 221.

Or, the first window 221 may include M sub-windows, where M is a positive integer less than or equal to N. For example, when M=N, the first window 221 includes N sub-windows corresponding to the N drive traces 230, and the upper electrode 120 extends from the upper surface of the piezoelectric layer 110 into the N sub-windows to respectively connect the first connection regions 231 of the N drive traces 230 located in respective corresponding sub-windows.

It should be understood that the N drive traces are divided based on the number of independent signals. One of the drive traces transmitting an independent signal is referred to as a drive trace, and the N drive traces transmit N independent signals respectively. However, the number of metal traces used to transmit a corresponding independent signal thereof in each of the drive traces may be 1, or may be a plurality of metal traces connected in parallel.

In an implementation, the passivation layer 220 is further provided with N second windows 222 corresponding to the N drive traces 230, wherein a second connection region 232 of each of the drive traces 230 located in its corresponding second window 222 is connected to the circuit board 30 below the ultrasonic fingerprint chip 20 through a corresponding lead wire 310.

On the one hand, the compactness of the silver paste material of the upper electrode 120 is too low to support a bonding process (or known as a wiring process). However, by manufacturing the drive traces 230 on the top metal layer TM, the upper electrode 120 can be led out to the chip surface through the drive traces 230. On the other hand, a conventional TFT surface does not support the bonding process. However, a silicon substrate 210 is used for the ultrasonic fingerprint chip of the present disclosure, so that the bonding process can be implemented on the silicon substrate 210 to connect the drive traces 230 to the circuit board 30 through the lead wire 310. In this way, the interconnection between the upper electrode 120 and the circuit board 30 is implemented.

The first connection regions 231 of the N drive traces are connected through the silver paste of the upper electrode 120. The second connection regions 232 of the N drive traces are isolated from each other, and need to be connected to the corresponding N lead wires respectively through N independent bonding pads 241.

Specifically, as shown in FIG. 2, a part of the drive traces 230 located in the second window 222 are the second connection regions 232 of the drive traces 230, the first connection regions 231 of the drive traces 230 are connected to the upper electrode 120, and the second connection regions 232 are connected to the lead wires 310 through the bonding pads 241, thereby achieving the interconnection between the upper electrode 120 and the circuit board 30 through the drive traces 230 and the lead wires 310.

In an embodiment of the present disclosure, the number N of the above-mentioned drive traces 230 may be a positive integer. For example, N=1 means that only one drive trace is manufactured on the top metal layer TM; or N=2 means that two independent drive traces 230 are manufactured on the top metal layer TM respectively to transmit two independent signals; or a larger number of independent drive traces 230 may be manufactured on the top metal layer TM.

Figure 3:
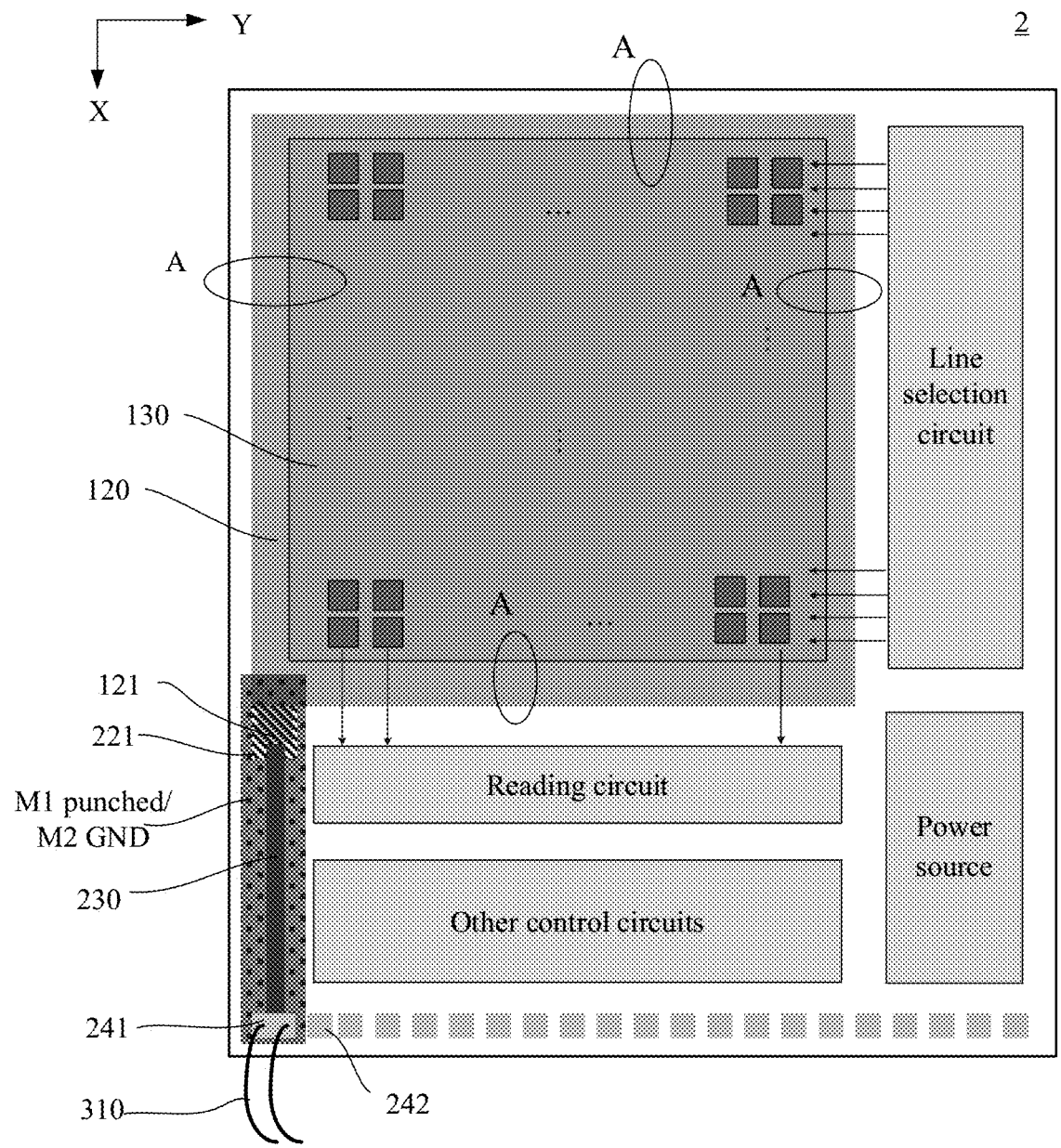
FIG. 3 is a schematic top view of a possible structure of the ultrasonic fingerprint apparatus shown in FIG. 2.

For example, N=1, as shown in FIG. 3, FIG. 3 is a top view of a possible structure of the ultrasonic fingerprint apparatus 2 shown in FIG. 2. The number of drive traces 230 of the top metal layer TM is 1. The first window 221 corresponding to the drive traces 230 is provided above the passivation layer 220, and the upper electrode 120 extends from the upper surface of the piezoelectric layer 110 into the first window 221 for connection to the first connection regions 231 of the drive traces 230 located in the first window 221.

Figure 4:
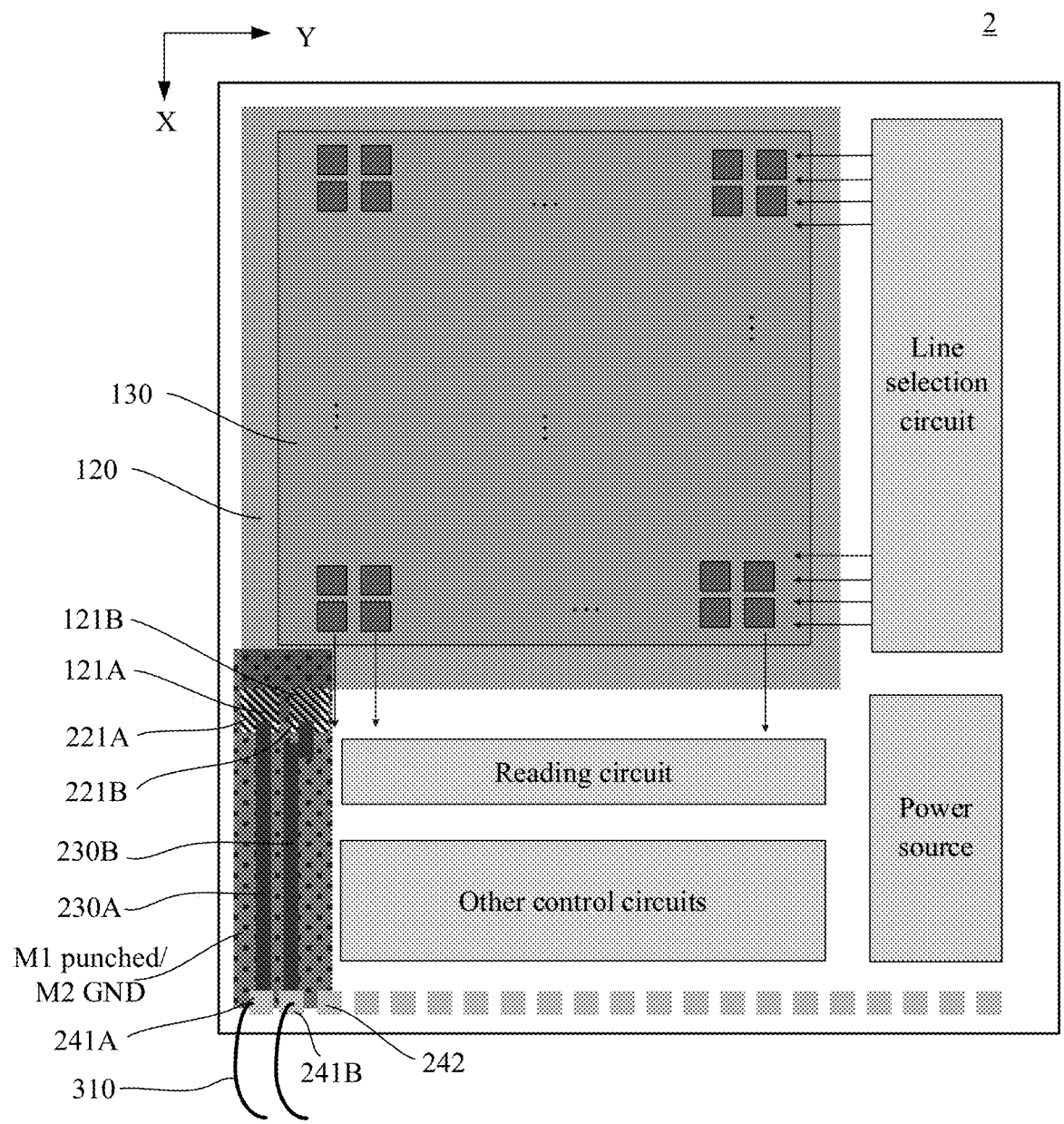
FIG. 4 is a schematic top view of another possible structure of the ultrasonic fingerprint apparatus shown in FIG. 2.

For another example, N=2, as shown in FIG. 4. FIG. 4 is a top view of another possible structure of the ultrasonic fingerprint apparatus 2 shown in FIG. 2. The number of independent drive traces 230 included in the top metal layer TM is 2, namely a drive trace 230A and a drive trace 230B.

The passivation layer 220 is provided with a sub-window 221A corresponding to the drive trace 230A and a sub-window 221B corresponding to the drive trace 230B. The upper electrode 120 extends from the upper surface of the piezoelectric layer 110 into the sub-window 221A and the sub-window 221B for connection to a part of the drive trace 230A located in the sub-window 221A and a part of the drive trace 230B located in the first window 221B respectively.

A material of the drive traces 230 is generally a metal such as aluminum (Al). Aluminum is highly chemically active, and will form aluminum oxide ($Al_2O_3$) in air. When a window is opened on the passivation layer 220, The aluminum of the drive traces 230 located in the first connection regions 231 in the first window 221 will be exposed to air, an aluminum oxide film will be formed on a surface thereof, aluminum oxide is non-conductive, and this aluminum oxide film layer will prevent the interaction between the silver paste and aluminum, thereby resulting in poor contact between the upper electrode 120 and the drive traces 230. In order to eliminate the influence of the oxide layer 2313 on the first connection regions 231, an anti-oxidative protective layer may be plated on a surface of the first connection regions 231, or a high voltage may be applied to the drive traces 230 to break down the oxide layer 2313 using the high voltage. However, for the former, the film plating process will greatly increase the costs, and for the latter, since an equivalent circuit of the piezoelectric layer 110 is a capacitor, the capacitor is equivalent to an open circuit for a DC voltage. Whether the oxide layer 2313 has been broken down cannot be determined by measuring the resistance, and can only be measured through an AC signal, which is not accurate enough and fails to be intuitively determined. In addition, the applied high voltage is re-applied to both ends of the oxide layer 2313 through the equivalent capacitor of the piezoelectric layer 110, so that the voltage actually falling on both ends of the oxide layer 2313 is much smaller than the externally applied voltage, and so that a higher voltage is required to break down the oxide layer 2313, which is not conducive to implementation of mass production.

Figure 5:
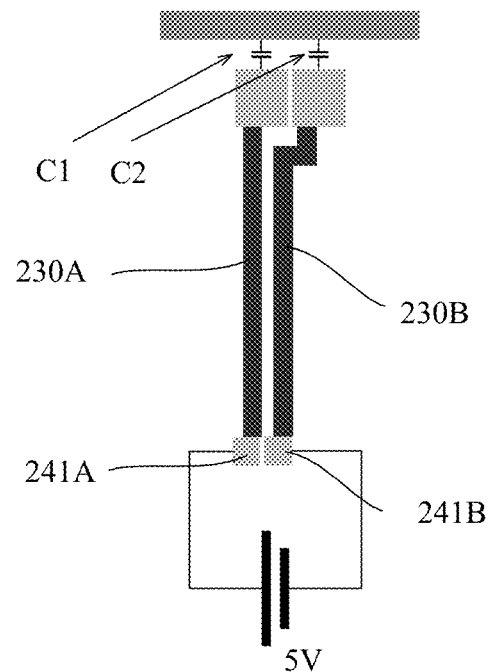
FIG. 5 is an equivalent circuit diagram between a drive trace and an upper electrode when an oxide layer formed on a first connection region is not broken down.
Figure 6:
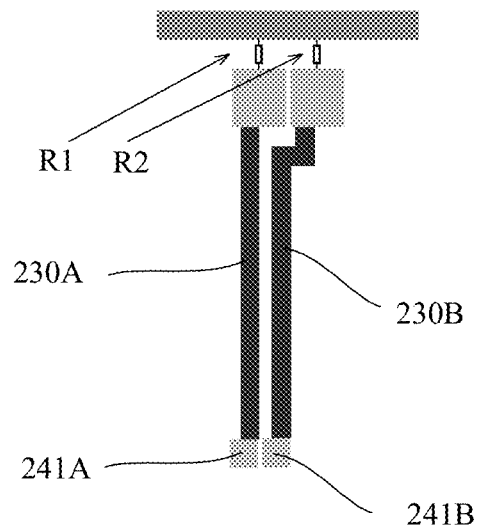
FIG. 6 is an equivalent circuit diagram between a drive trace and an upper electrode when an oxide layer formed on a first connection region is broken down.

For the case where the number of drive traces 230 shown in FIG. 4 is 2, the efficiency of breakdown of the oxide layer 2313 can be obviously improved, and the DC resistance after breakdown can be accurately detected. Detailed description will be given below with reference to FIGS. 5 and 6. FIG. 5 is an equivalent circuit diagram of the oxide layer 2313 that is not broken down, and FIG. 6 is an equivalent circuit diagram of the oxide layer 2313 that is broken down.

As shown in FIG. 5, a bonding pad 241A connected to the drive trace 230A and a bonding pad 241B connected to the drive trace 230B are connected to external voltages respectively. For example, the bonding pad 241A is connected to 5V, the bonding pad 241B is connected to GND, or the bonding Pad 241A is connected to GND, and the bonding pad 241B is connected to 5V. The 5V here is merely an example, and other voltage values may also be used.

Assuming that there is the oxide layer 2313 between a part of the drive trace 230A in the sub-window 221A and a silver paste pad 121A, there is the oxidation layer 2313 between a part of the drive trace 230B in the sub-window 221B and a silver paste pad 121B of the upper electrode 120, and the oxide layer 2313 may be equivalent to a capacitor C1 and a capacitor C2 shown in FIG. 5. In this way, a voltage of 5V will be directly applied to both ends of the oxide layer 2313, thereby directly breaking down the oxide layer 2313, and failing to be isolated by the capacitor C1 and the capacitor C2 of the piezoelectric layer 110. The current of the external voltage of 5V is detected. When the oxide layer 2313 is broken down, the current through the voltage of 5V will increase significantly, thereby accurately determining whether the oxide layer 2313 is broken down. When the oxide layer 2313 is determined to be broken down, as shown in FIG. 6, DC resistances R1 and R2 between the bonding pad 241A and the bonding pad 241B can be measured to directly determine the breakdown effects and interconnection impedance, thereby accurately determining the connection between the upper electrode 120 and the drive traces 230 after breakdown.

Only a DC voltage is required for testing throughout the above-mentioned testing process, and an AC voltage is not required to measure the capacitance. Further, the testing voltage is relatively much lower, and the interconnection resistance can be accurately measured and monitored without increasing the size of the ultrasonic fingerprint chip 20, thereby reducing the costs, improving the testing efficiency, and contributing to mass production.

It should be understood that after testing, during application to an actual product, the bonding pad 241A and the bonding pad 241B may continue to be disconnected, or may be short-circuited. That is, the second connection region 232 of the drive trace 230A and the second connection region 232 of the drive trace 230B may be disconnected, or may be connected to each other. When they are connected, the drive trace 230A and the drive trace 230B are combined into one driver trace 230.

In FIGS. 5 and 6, as an example, the top metal layer TM includes two drive traces, that is, N=2. When N is another value, they need to be tested pairwise. For example, when N=3, a first drive trace and a second drive trace may be first tested, of which one is grounded and a voltage is applied to the other; and then the second drive trace and a third drive trace are tested, of which one is grounded and a voltage is applied to the other.

For the sake of brevity, as an example, N=1, that is, as an example, the top metal layer TM includes 1 drive trace, and a positional relationship between the drive trace 230 and the metal layers and sizes thereof are described below.

In an implementation, as shown in FIGS. 2-4, the piezoelectric layer 110 extends onto the plurality of metal layers, the N drive traces 230 extend into the piezoelectric layer 110, and the first connection regions 231 of the N drive traces 230 are adjacent to the piezoelectric layer 110. When the piezoelectric layer 110 extends onto the plurality of metal layers and the drive traces 230 extend into the piezoelectric layer 110, the first connection regions 231 of the drive traces 230 can be made to be close to the edge of the piezoelectric layer 110, that is, a distance between the piezoelectric layer 110 and the first connection regions 231 is minimized, making the structure of the ultrasonic fingerprint apparatus 2 more compact.

In an implementation, as shown in FIG. 2, a size of the first window 221 is larger than or equal to a size of the first connection regions 231 of the N drive traces, and the upper electrode 120 extends from the upper surface of the piezoelectric layer to a first part 221a of the first window 221 to cover the first connection regions 231 of the N drive traces 230, and a second part 221b of the first window 221 is located under the piezoelectric layer 110.

It can be seen that when the size of the first window 221 is larger than the size of the first connection regions 231, the upper electrode 120 extends into the first part 221a of the first window 221 to cover one of the first connection regions 231 in the first part 221a where the drive traces 230 are located, and the second part 221b of the first window 221 extends into the piezoelectric layer 110 and is located under the piezoelectric layer 110, thereby improving the connection reliability between the upper electrode 120 and the drive traces 230.

In an implementation, the size S of the first part 221a in a direction of the drive traces 230, that is, the X direction, is, for example, larger than or equal to 150 µm. In FIG. 2, the size of the first window 221 is, for example, S=240 µm. The size g of the second portion 221b in the direction of the drive traces 230 is, for example, larger than or equal to 20 µm.

The driving signal of the upper electrode 120 is generally at a high voltage, is significantly higher than a working voltage of a circuit in the ultrasonic fingerprint chip 20, and not only tends to interfere with the circuit in the ultrasonic fingerprint chip 20, but also tends to cause electrical breakdown damage to the ultrasonic fingerprint chip 20. Therefore, in an implementation, a distance should be maintained between other traces adjacent to the N drive traces 230 on the top metal layer TM and the N drive traces 230, for example, the distance between the other traces adjacent to the drive traces 230 on the top metal layer TM and the drive traces 230 is larger than or equal to 10 µm, thereby avoiding intralayer breakdown, ensuring the safety of the ultrasonic fingerprint apparatus 2, and preventing the drive traces 230 from interfering with the other traces on the top metal layer TM.

Figure 7:
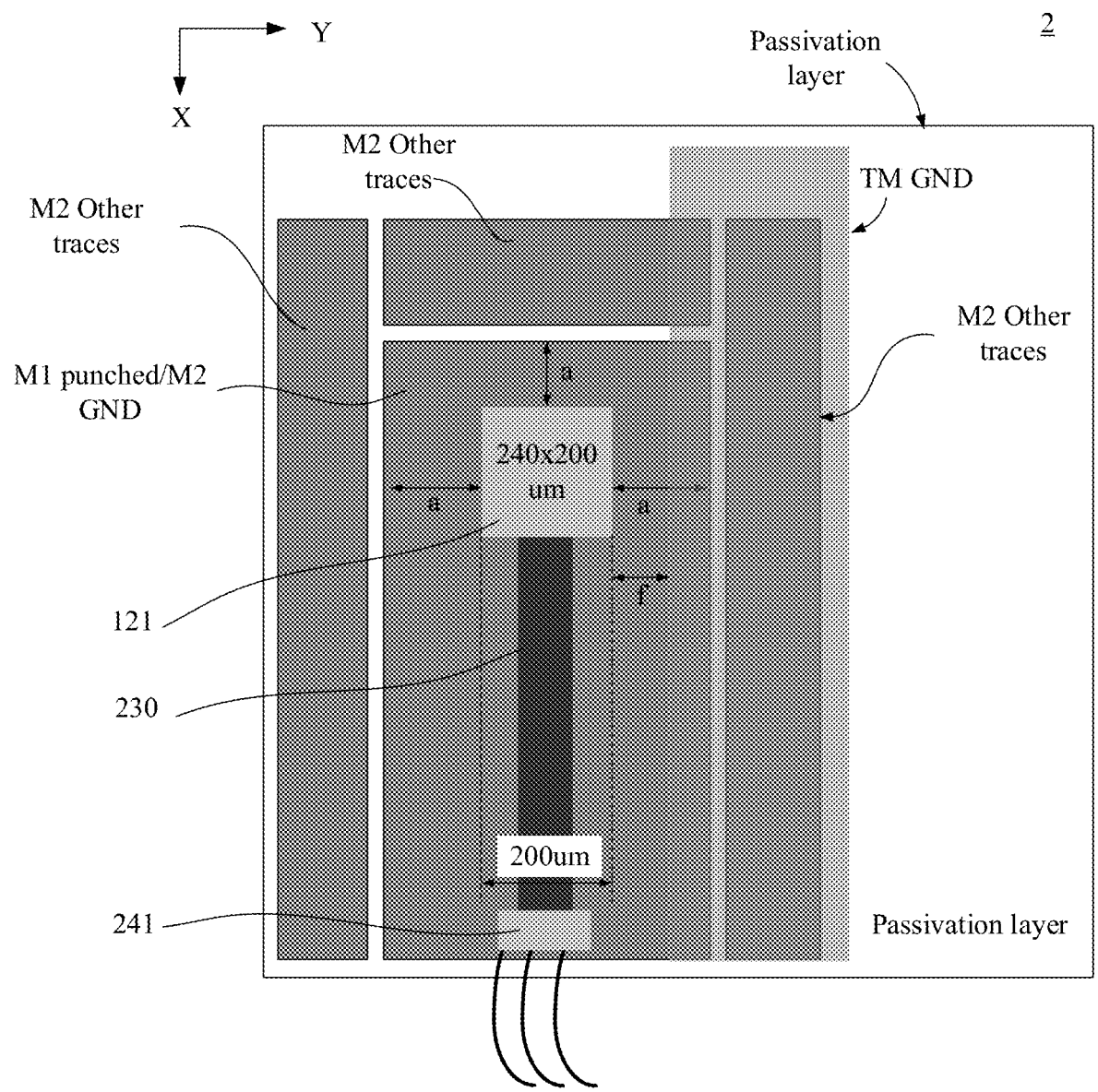
FIG. 7 is a schematic top view of a local region of the ultrasonic fingerprint apparatus shown in FIG. 2.

FIG. 7 is a schematic top view of a local region of the ultrasonic fingerprint apparatus 2 shown in FIG. 2. As an example, FIG. 7 only shows 1 drive trace, and a distance between other traces on the top metal layer TM and the drive trace 230 is f=10 µm.

In an embodiment of the present disclosure, since the drive trace 230 is electrically connected to the silver paste pad 121, the distance between any one described metal layer and the drive trace 230 refers to a distance between the metal layer and an edge of the silver paste pad 121. In FIGS. 2-7, as an example, the silver paste pad 121 is rectangular and has a size of 240 µm×200 µm. The size of the first connection regions 231 of the drive traces 230 in the Y direction can be considered as the corresponding size of the silver paste pad 121. The size of the drive traces 230 in the Y direction is 200 µm as shown by the dotted line in FIG. 7, and a distance between each annotated metal layer and each of the drive traces 230 refers to a distance from the shown dotted line, that is, the distance from the edge of the silver paste pad 121.

In an implementation, the other traces adjacent to the N drive traces 230 on the top metal layer TM are grounded, so that the top metal layer TM has shielding effects on the N drive traces 230, thereby preventing the N drive traces 230 from interfering with the other traces on the top metal layer TM. For example, as shown in FIG. 7, FIG. 7 only shows other traces of the top metal layer TM located on a right side of the drive traces 230, and the other traces adjacent to the drive traces 230 on the top metal layer TM are grounded. Similarly, parts (not shown) of the top metal layer TM located on upper and left sides of the drive traces 230 are also grounded.

In an implementation, as shown in FIGS. 2-7, a region corresponding to the N drive traces 230 in a first metal layer M1 among the plurality of metal layers is punched, and the first metal layer M1 is an adjacent metal layer located below the top metal layer TM.

Since the first metal layer M1 is the adjacent metal layer located below the top metal layer TM, the corresponding region of the first metal layer M1 located below the N drive traces 230 is punched, to increase an electrical gap between the N drive traces 230 and other traces of the first metal layer M1, thereby increasing the withstand voltage strength of the first metal layer M1, and avoiding the occurrence of interlayer breakdown between the top metal layer TM and the first metal layer M1.

In order to further increase the electrical gap between the drive traces 230 and the other traces of the first metal layer M1 and minimize the occurrence of interlayer breakdown between the top metal layer TM and the first metal layer M1, in an implementation, as shown in FIGS. 2-7, the region corresponding to the N drive traces 230 in the first metal layer M1 and a surrounding region extending a=12 µm or more in all directions from the region. That is to say, the punched region is extended a certain distance a in all directions from the region corresponding to the N drive traces 230

In an implementation, as shown in FIGS. 2-7, a region corresponding to the drive traces 230 in a second metal layer M2 among the plurality of metal layers is grounded, and the second metal layer M2 is an adjacent metal layer located below the first metal layer M1.

Since the second metal layer M2 is an adjacent metal layer located below the first metal layer M1, the corresponding region of the second metal layer M2 located below the N drive traces 230 is grounded, so that the second metal layer M2 has shielding effects on the drive traces 230, thereby preventing other traces on the second metal layer M2 from interfering with traces on a third metal layer M3 located below the second metal layer. In this way, traces of the third metal layer M3 and the fourth metal layer M4 may be freely selected.

In order to still further enhance the shielding effects of the second metal layer M2 on the drive traces 230 and minimize the interference of the other traces on the second metal layer M2 with the traces on the third metal layer M3 located below the second metal layer, in an implementation, the region corresponding to the N drive traces 230 on the second metal layer M2 and a surrounding region extending 12 µm or more in all directions from the region are grounded. For example, as shown in FIGS. 2-7, a region of the second metal layer M2 located below the drive traces 230 and the surrounding region extending by the distance a in all direction from the region is grounded, to reduce the interference of the other traces on the second metal layer M2 with the traces on the third metal layer M3 located below the second metal layer.

Generally, the lower electrode 130 is an electrode array composed of a plurality of electrodes, and each electrode in the electrode array corresponds to a pixel in the fingerprint image. Therefore, an electrode array below the piezoelectric layer 110 can be regarded as a pixel array.

In order to prevent a high voltage of the drive traces 230 from causing electrical breakdown and interference to the metal layer in the ultrasonic fingerprint chip 20, in an implementation, as shown in FIGS. 2-4, the top metal layer TM is provided with a bonding pad for grounding, that is, a GND pad 242. The GND pad 242 is located beside a second connection region 232 of the N drive traces 230. A GND pad 242 is provided beside bonding pads 241 of the N drive traces 230, with a certain distance between the GND pad 242 and each of the bonding pads 241, thereby preventing a driving signal transmitted on the drive traces 230 from interfering with other surrounding signals.

Figure 8:
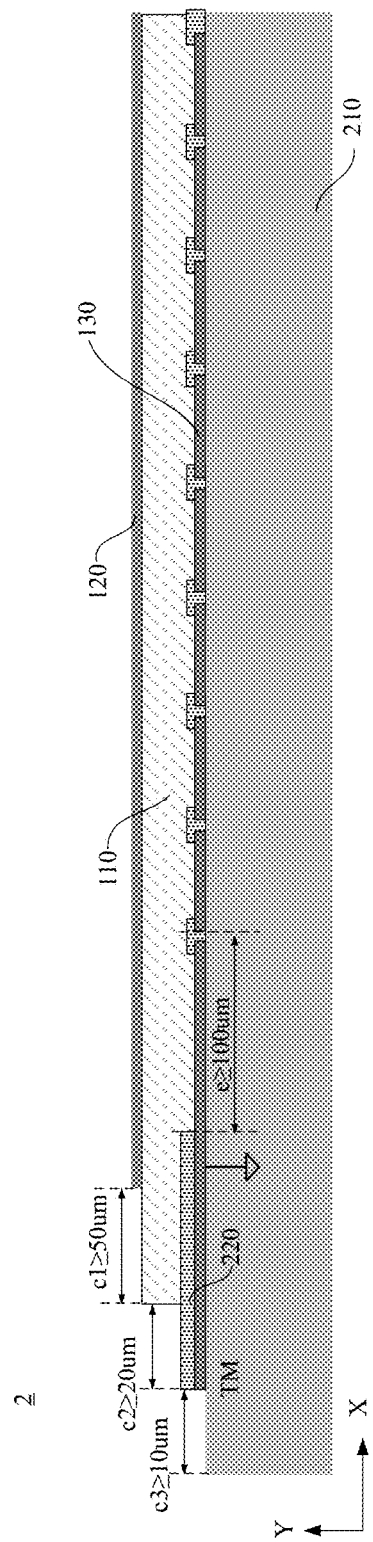
FIG. 8 is a section view of a region A in FIG. 3 along a direction perpendicular to an edge of a piezoelectric transducer.

FIG. 8 is a section view of a region A in FIG. 3 along a direction perpendicular to an edge of a piezoelectric transducer 10. In an implementation, as shown in FIG. 8, a distance e between the lower electrode 130 and the passivation layer 220 around the lower electrode 130 is larger than or equal to 100 µm. In another implementation, as shown in FIG. 8, other traces adjacent to the lower electrode 130 on the top metal layer TM are grounded.

There is a certain spacing between the lower electrode 130 and the passivation layer 220 around the lower electrode 130, and/or the other traces adjacent to the lower electrode 130 on the top metal layer TM are grounded, which can play a shielding role to prevent external interference from affecting pixels in the proximity of an edge in an array of the lower electrode 130.

Further, as shown in FIG. 8, for edge pixels on a left side, because the distance e is reserved to open a window for the passivation layer 220, there is also a metal circuit on the left side of the edge pixels, and there is a balance between the metal circuit on the left side and an electrode on a right side thereof, as if these edge pixels are also like a center pixel, thereby reducing the edge effects of the edge pixels, and improving the consistency between the edge pixels and the center pixel.

In an implementation, as shown in FIG. 8, a distance c1 between an edge of the upper electrode 120 and an edge of the piezoelectric layer 110 is larger than or equal to 50 μm, thereby preventing the upper electrode 120 from overflowing to a surface of the ultrasonic fingerprint chip 20, and avoiding the risks of breakdown.

In addition, as shown in FIG. 8, the edge of the passivation layer 220 exceeds the edge of the piezoelectric layer 110 by the distance c2, where c2 is, for example, larger than or equal to 20 μm; and/or an edge of the substrate 210 exceeds the edge of the passivation layer 220 by c3, where the c3 is, for example, larger than or equal to 10 μm.

In an implementation, N=1, and an area of a part of the first window 221 close to the piezoelectric layer 110 is larger than an area of a part of the first window away from the piezoelectric layer 110, thereby improving the connection reliability between the upper electrode 120 and the drive traces.

Figure 9:
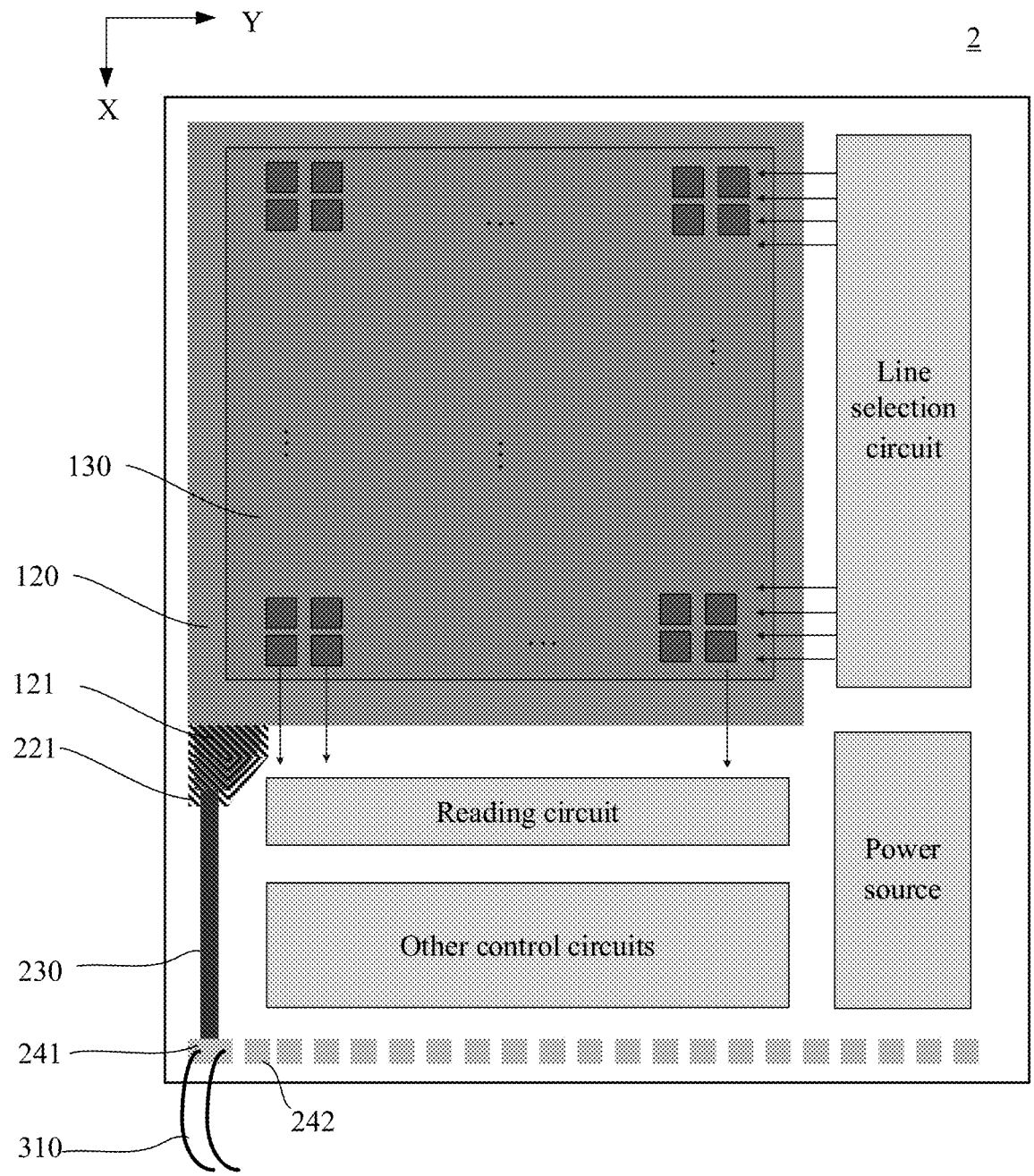
FIG. 9 is a schematic diagram of a shape of a first window in an embodiment of the present disclosure.
Figure 10:
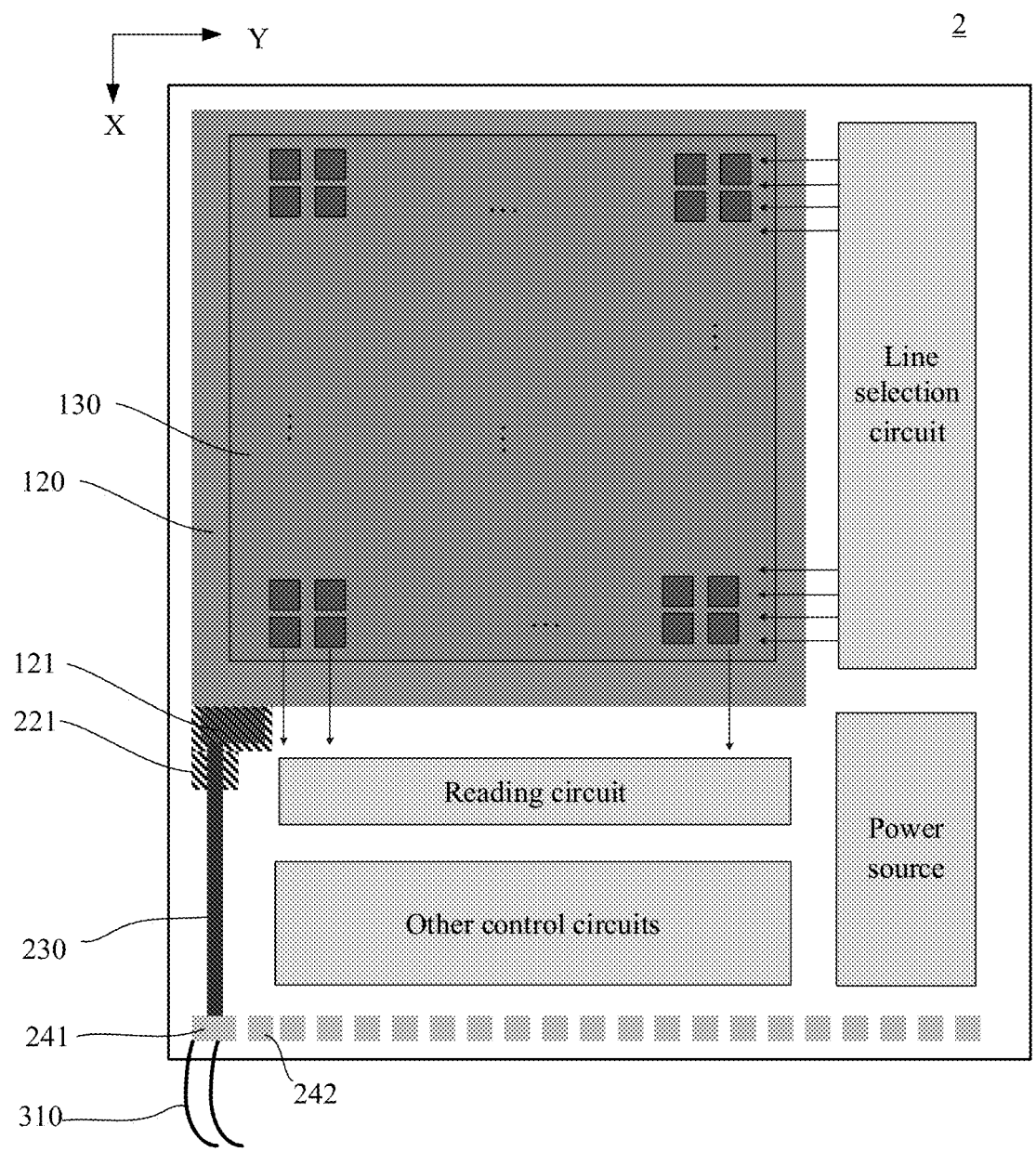
FIG. 10 is a schematic diagram of a shape of a first window in another embodiment of the present disclosure.
Figure 11:
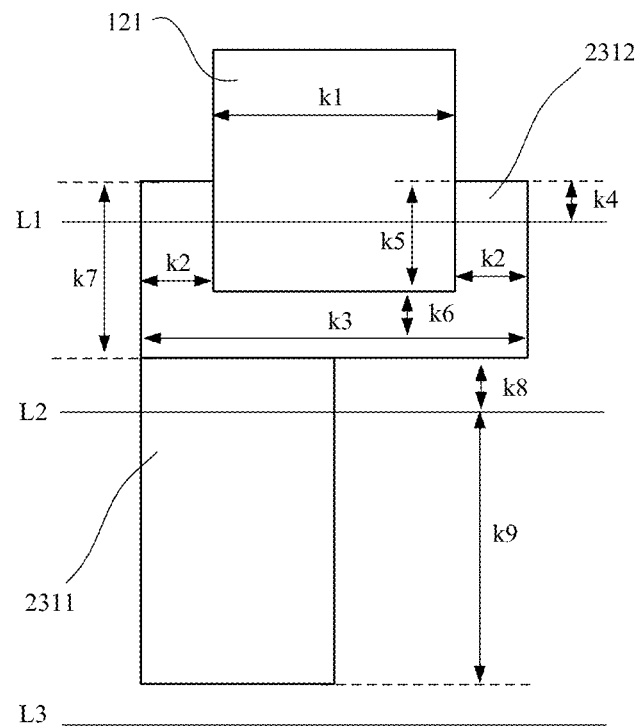
FIG. 11 is a schematic diagram of some possible sizes of an L-shape in FIG. 10.

For example, FIGS. 9-11 show shapes and sizes of the first window 221 in some implementations of the present disclosure. For example, as shown in FIG. 9, a shape of the first window 221 is a trapezoid, where a lower base of the trapezoid is closer to the piezoelectric layer 110 than an upper base of the trapezoid. For another example, as shown in FIGS. 10 and 11, a shape of the first window 221 is an L-shape, the L-shape is composed of a first part 2311 parallel to a direction of the drive traces 230 and a second part 2312 perpendicular to the direction of the drive traces 230, and the second part 2312 is closer to the piezoelectric layer 110 than the first part 2311.

FIG. 11 shows some possible sizes of the L-shaped first window 221 in FIG. 10. A size of a part of the L-shape close to the piezoelectric layer 110 in the Y direction is larger than a size of a part of the L-shape away from the piezoelectric layer 110 in the Y direction, to improve the connection reliability between the upper electrode 120 and the first connection regions 231 of the drive traces 230 without occupying an additional area. L1, L2, and L3 represent the edge of the piezoelectric layer 110, an edge of an over coating on a surface of the upper electrode 120, and a die edge of the ultrasonic fingerprint chip 20 respectively. The silver paste pad 121 is filled in a partial region of the L-shape in the first window 221, and covers the first connection regions 231 of the drive traces 230, where FIG. 11 is only an example, k1 is a size of the silver paste pad 121, k1=204 μm, sizes of the L-shape are respectively: k2=100 μm, k3=404 μm, k4=20 μm, k5=244.5 μm, k6=100 μm, k7=215 μm, k8=100 μm, and k9 determined based on k7, which may be 1000 μm here.

It should be understood that ranges of various parameters that are not specifically illustrated in FIGS. 2-11 can be regarded as ±50% of the values shown.

Figure 12:
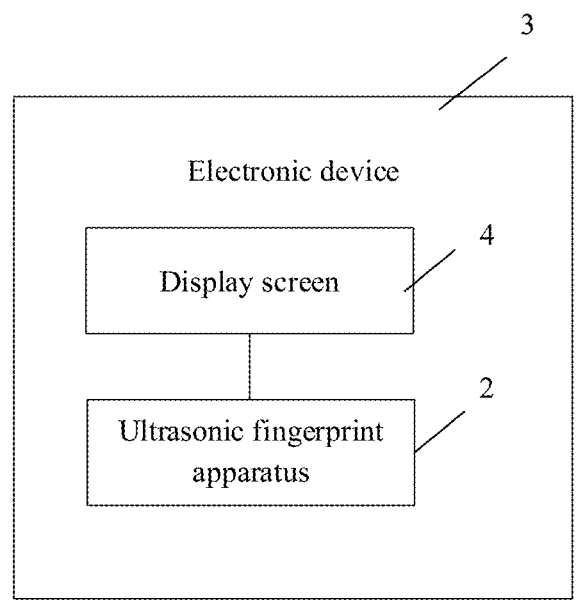
FIG. 12 is a schematic block diagram of an electronic device in an embodiment of the present disclosure.

As shown in FIG. 12, the present disclosure further provides an electronic device 3. The electronic device 3 includes a display screen 4; and the above-mentioned ultrasonic fingerprint apparatus 2. An ultrasonic fingerprint chip 20 is bonded to the display screen 4 through an adhesive film 301, so that the ultrasonic fingerprint apparatus 2 is located below the display screen 4, thereby implementing under-display ultrasonic fingerprint identification.

As an example and non-restrictively, the electronic device in an embodiment of the present disclosure may be a portable or mobile computing device, such as a terminal device, a mobile phone, a tablet computer, a notebook computer, a desktop computer, a game device, a vehicle electronic device, or a wearable smart device, or may be other electronic devices, such as an electronic database, an automobile, or an automated teller machine (ATM) of a bank. The wearable smart device includes a device that has complete functions and a large size, and can realize complete or partial functions without relying on a smart phone, such as a smart watch or smart glasses, and includes a device that only focuses on a certain type of application functions and needs to be used in cooperation with other devices such as a smart phone, for example, various smart bracelets and smart jewelries for monitoring physical signs.

It should be noted that the embodiments in the present disclosure and/or the technical features in the embodiments may be combined with each other in any way in case of no conflict, and the combined technical solutions should also fall into the scope of protection of the present disclosure.

The system, apparatus, and method disclosed in the embodiments of the present disclosure may be implemented by other approaches. For example, some features of the method embodiments described above may be neglected, or may not be performed. The above described apparatus embodiments are merely illustrative, the division of the units is only a logical function division, other division manners may be available during actual implementations, and a plurality of units or components may be combined or may be integrated into another system. In addition, the coupling between the units or the coupling between the components may be direct coupling or indirect coupling, and the above-mentioned coupling includes electrical, mechanical, or other forms of connection.

Those skilled in the art can clearly understand that, for convenience and simplicity of description, corresponding processes and technical effects in the above method embodiments may be referred to for specific working process of the above described apparatus and device and technical effects thereof, which will not be repeated here.

It should be understood that the specific examples in the embodiments of the present disclosure are provided only to help those skilled in the art to better understand the embodiments of the present disclosure, rather than limiting the scope of the embodiments of the present disclosure. Those skilled in the art may make various improvements and modifications on the basis of the above embodiments, and these improvements or modifications all fall within the scope of protection of the present disclosure.

While the above description merely provides specific embodiments of the present disclosure, the scope of protection of the present disclosure is not limited to the specific embodiments. Any person skilled in the art can easily conceive of alterations or replacements within the technical scope disclosed in the present disclosure. All these alterations or replacements should be encompassed within the scope of protection of the present disclosure. Therefore, the scope of protection of the present disclosure should be determined by the scope of protection of the appended claims.

What is claimed is:

1. An ultrasonic fingerprint apparatus, being arranged under a display screen of an electronic device to implement under-display ultrasonic fingerprint identification, wherein the ultrasonic fingerprint apparatus comprises:
 an ultrasonic fingerprint chip, comprising:
  a substrate; and
  a plurality of metal layers arranged in a first region of the substrate; and
 a piezoelectric transducer, arranged above the ultrasonic fingerprint chip and comprising:
  a piezoelectric layer;
  an upper electrode located above the piezoelectric layer; and
  a lower electrode located below the piezoelectric layer and above a second region of the substrate, wherein:
 a top metal layer among the plurality of metal layers comprises N drive traces;
 N=1 or N is a positive integer greater than 1;
 a passivation layer is provided above the top metal layer, and provided with a first window corresponding to the N drive traces; and
 the upper electrode extends from an upper surface of the piezoelectric layer into the first window for connection to respective first connection regions of the N drive traces located in the first window.

2. The ultrasonic fingerprint apparatus according to claim 1, wherein the first window comprises N sub-windows corresponding to the N drive traces, and a respective first connection region of each of the drive traces is located in a sub-window corresponding to the drive trace.

3. The ultrasonic fingerprint apparatus according to claim 1, wherein the substrate is a silicon substrate, and the passivation layer is further provided with N second windows corresponding to the N drive traces, wherein a second connection region of each of the drive traces located in corresponding second window is connected to a circuit board below the ultrasonic fingerprint chip through a corresponding lead wire.

4. The ultrasonic fingerprint apparatus according to claim 1, wherein the piezoelectric layer extends onto the plurality of metal layers, the N drive traces extend into the piezoelectric layer, and the first connection regions of the N drive traces are adjacent to the piezoelectric layer.

5. The ultrasonic fingerprint apparatus according to claim 4, wherein a size of the first window is larger than a size of the first connection regions of the N drive traces, the upper electrode extends from the upper surface of the piezoelectric layer into a first part of the first window to cover the first connection regions of the N drive traces, and a second part of the first window is located under the piezoelectric layer.

6. The ultrasonic fingerprint apparatus according to claim 5, wherein a size of the first part in a direction of the N drive traces is larger than or equal to 150 µm; and/or a size of the second part in the direction of the N drive traces is larger than or equal to 20 µm.

7. The ultrasonic fingerprint apparatus according to claim 1, wherein a distance between other traces adjacent to the N drive traces on the top metal layer and the N drive traces is larger than or equal to 10 µm; and/or the other traces adjacent to the N drive traces on the top metal layer are grounded.

8. The ultrasonic fingerprint apparatus according to claim 1, wherein a region corresponding to the N drive traces in a first metal layer among the plurality of metal layers is punched, wherein the first metal layer is an adjacent metal layer located below the top metal layer.

9. The ultrasonic fingerprint apparatus according to claim 8, wherein the region corresponding to the N drive traces in the first metal layer and a surrounding region extending 12 µm or more in all directions from the region are punched.

10. The ultrasonic fingerprint apparatus according to claim 1, wherein a region corresponding to the N drive traces in a second metal layer among the plurality of metal layers is grounded, wherein the second metal layer is an adjacent metal layer located below the first metal layer.

11. The ultrasonic fingerprint apparatus according to claim 10, wherein the region corresponding to the N drive traces in the second metal layer and a surrounding region extending 12 µm or more in all directions from the region are grounded.

12. The ultrasonic fingerprint apparatus according to claim 1, wherein the top metal layer is provided with a bonding pad for grounding, and the bonding pad is arranged beside the second connection regions of the N drive traces.

13. The ultrasonic fingerprint apparatus according to claim 1, wherein a distance between the lower electrode and the passivation layer around the lower electrode is larger than or equal to 100 µm; and/or the other traces adjacent to the lower electrode in the top metal layer are grounded.

14. The ultrasonic fingerprint apparatus according to claim 1, wherein a distance between an edge of the upper electrode and an edge of the piezoelectric layer is larger than or equal to 50 µm.

15. The ultrasonic fingerprint apparatus according to claim 1, wherein N=1, and an area of a part of the first window close to the piezoelectric layer is larger than an area of a part of the first window away from the piezoelectric layer.

16. The ultrasonic fingerprint apparatus according to claim 15, wherein a shape of the first window is a trapezoid, and a lower base of the trapezoid is closer to the piezoelectric layer than an upper base of the trapezoid.

17. The ultrasonic fingerprint apparatus according to claim 16, wherein a shape of the first window is an L-shape, the L-shape comprises a first part parallel to a direction of the drive traces and a second part perpendicular to the direction of the drive traces, and the second part is closer to the piezoelectric layer than the first part.

18. An electronic device, comprising:
 a display screen; and
 an ultrasonic fingerprint apparatus, arranged under the display screen to implement under-display ultrasonic fingerprint identification, wherein the ultrasonic fingerprint apparatus comprises:
 an ultrasonic fingerprint chip, comprising:
  a substrate; and
  a plurality of metal layers arranged in a first region of the substrate; and
 a piezoelectric transducer, arranged above the ultrasonic fingerprint chip and comprising:
  a piezoelectric layer;
  an upper electrode located above the piezoelectric layer, and
  a lower electrode located below the piezoelectric layer and above a second region of the substrate, wherein:
 a top metal layer among the plurality of metal layers comprises N drive traces;
 N=1 or N is a positive integer greater than 1;

a passivation layer is provided above the top metal layer, and provided with a first window corresponding to the N drive traces; and the upper electrode extends from an upper surface of the piezoelectric layer into the first window for connection to respective first connection regions of the N drive traces located in the first window.

\* \* \* \* \*